US008198350B2

(12) United States Patent
Fee et al.

(10) Patent No.: US 8,198,350 B2
(45) Date of Patent: Jun. 12, 2012

(54) POLYMER-MODIFIED ASPHALT WITH A CROSSLINKING AGENT AND METHODS OF PREPARING

(75) Inventors: Darrell C. Fee, Chesterfield, MO (US); Rene Maldonado, Brentwood, MO (US); Enrique E. Romagosa, Holladay, UT (US)

(73) Assignee: ICL Performance Products, LP, St. Louis, MO (US)

( * ) Notice: Subject to any disclaimer, the term of this patent is extended or adjusted under 35 U.S.C. 154(b) by 67 days.

(21) Appl. No.: 12/704,185

(22) Filed: Feb. 11, 2010

(65) Prior Publication Data

US 2011/0196073 A1   Aug. 11, 2011

(51) Int. Cl.
  *E01C 7/26* (2006.01)
  *C08L 95/00* (2006.01)
(52) U.S. Cl. .......................................... 524/68; 524/59
(58) Field of Classification Search ...................... 524/68
  See application file for complete search history.

(56) References Cited

U.S. PATENT DOCUMENTS

| 4,145,322 A | 3/1979 | Maldonado et al. |
| 4,242,246 A | 12/1980 | Maldonado et al. |
| 5,672,642 A | 9/1997 | Gros |
| 5,880,185 A * | 3/1999 | Planche et al. ............. 524/68 |
| 6,011,095 A | 1/2000 | Planche et al. |
| 6,588,974 B2 * | 7/2003 | Hildebrand et al. .......... 404/31 |
| 7,037,961 B2 | 5/2006 | Rivas et al. |
| 7,309,390 B2 | 12/2007 | Falkiewicz |
| 7,417,082 B2 * | 8/2008 | Martin ....................... 524/68 |
| 7,495,045 B2 | 2/2009 | Buras et al. |
| 2006/0223916 A1 | 10/2006 | Stuart et al. |
| 2007/0287778 A1 * | 12/2007 | Martin ....................... 524/59 |
| 2008/0141899 A1 * | 6/2008 | Buras et al. ............... 106/284.3 |
| 2008/0194738 A1 | 8/2008 | Crews et al. |

OTHER PUBLICATIONS

U.S. Appl. No. 11/809,086.
U.S. Appl. No. 12/242,579.
http://www.lime.org/publications.html, "How to Add Hydrated Lime to Asphalt, An Overview of Current Methods," National Lime Association, Sep. 2003, pp. 1-15.
International Search Report and Written Opinion for PCT/US2010/061316 dated Feb. 16, 2011.
"The Multiple Stress Creep Recovery (MSCR) Procedure", Apr. 2011, 9 Pages, FHWA-HIF-11-038, U.S. Department of Transportation Federal Highway Administration, Office of Pavement Technology.

* cited by examiner

*Primary Examiner* — Ling Choi
*Assistant Examiner* — Hui Chin
(74) *Attorney, Agent, or Firm* — Thompson Coburn LLP (57) ABSTRACT

Methods of preparing a cross-linked, polymer-modified asphalt is provided. The method involves adding a crosslinking agent to asphalt prior to the addition of a crosslinkable polymer and an acid. Asphalt prepared by the disclosed methods exhibit improved properties such as properties measured by the Multiple Stress Creep Recovery (MSCR) test.

36 Claims, 1 Drawing Sheet

POLYMER-MODIFIED ASPHALT WITH A CROSSLINKING AGENT AND METHODS OF PREPARING

BACKGROUND OF INVENTION

Various polymer-modified asphalt compositions for paving and roofing applications and methods for preparing various polymer-modified asphalts are known. The degree to which a polymer improves an asphalt's properties depends on the compatibility of the polymer and the asphalt; e.g., a polymer that does not separate in a mixture of asphalt and polymer during storage. Highly compatible or compatibilized polymers are more effective in providing property improvements. An extensive range of additives have been used for the purpose of "crosslinking" polymers and asphalts, thereby rendering the mixture compatible. For example, sulfur is a well known crosslinking agent (U.S. Pat. Nos. 4,145,322 and 4,242,246). The addition of polymer to the asphalt first, followed by mixing, and then addition of the crosslinking agent is standard. In some instances, sulfur is added to the asphalt first, followed by the addition of polymer in some manner to the asphalt and sulfur (U.S. Pat. Nos. 5,672,642 and 7,037,961). In some instances, sulfur is added to one fraction of asphalt, polymer is added to a separate fraction of asphalt, and some portion of the two fractions are subsequently combined (U.S. patent application Ser. No. 12/242,579).

Asphalt modified with both a crosslinkable polymer and polyphosphoric acid and methods for preparing various modified asphalt compositions wherein the first modifier added to the asphalt is either polymer or phosphoric acid include: U.S. Pat. Nos. 5,880,185; 6,011,095; 7,495,045; and U.S. patent application Ser. No. 11/809,086. This order of addition is recognized in the art to result in cost-effective modified asphalt with acceptable rheological properties.

SUMMARY OF THE INVENTION

The present invention provides for a method of preparing a cross-linked, polymer-modified asphalt. The method involves first heating an asphalt. A crosslinking agent is then added to the heated asphalt and the asphalt and crosslinking agent are mixed to form an asphalt-crosslinking agent mixture. A crosslinkable polymer and an acid are then added to the asphalt-crosslinking agent mixture. The crosslinkable polymer and acid may be added sequentially without regard to order. The crosslinkable polymer and acid may also be added simultaneously. Regardless of the order of addition, the crosslinkable polymer and acid are mixed with the asphalt-crosslinking agent mixture to form a cross-linked, polymer-modified asphalt. It has been discovered that this order of addition, where the crosslinking agent is added first, produces a cross-linked, polymer-modified asphalt with improved properties.

The present invention also provides an asphalt paving composition and an asphalt roofing material comprising an cross-linked, polymer-modified asphalt prepared by the above method.

The present invention also provides a method of preparing a paving material. The method involves first preparing a cross-linked, polymer-modified asphalt prepared by the method described above. The modified asphalt is then mixed with water and an emulsifier at ambient temperature to create an asphalt emulsion. The emulsion is then spread to a desired thickness and then the emulsion is broken.

DETAILED DESCRIPTION OF THE INVENTION

Methods for preparing an improved cross-linked, polymer-modified asphalt composition comprising an asphalt, a crosslinkable polymer, a crosslinking agent, and an acid are provided herein. Surprisingly, it has been discovered that when a crosslinking agent is added and mixed into the asphalt before the addition of polymer and an acid, improvements in at least the following properties are observed: (a) the % recovery, as measured by Multiple Stress Creep Recovery (MSCR) test, is increased, indicating improved elastic response of the asphalt and (b) the non-recoverable creep compliance, $J_{nr}$, as measured by MSCR, is generally decreased, indicating improved rut resistance. These improvements were achieved using the same amount of crosslinking agent as in a method where the first modifier added to the asphalt is polyphosphoric acid. Thus, because the same amount of crosslinking agent is used, the method of the invention provides improved asphalt characteristics while avoiding any economic or performance penalty resulting from adding high amounts (1% or higher) of crosslinking agent. The improvements in properties observed when the crosslinking agent is added prior to the polymer are surprising because one skilled in the art might expect that this sequence of addition would result in the crosslinking agent being consumed or reacted before the polymer is added, and thus not available to cross-link the polymer.

Thus, in certain embodiments, a polymer-modified asphalt is prepared by heating an asphalt and adding a crosslinking agent to the asphalt. The asphalt and crosslinking agent are mixed together to form an asphalt-crosslinking agent mixture. To this asphalt-crosslinking mixture is then added crosslinkable polymer and acid.

Definitions

Unless otherwise defined, all technical and scientific terms used herein have the same meaning as commonly understood by one of ordinary skill in the art to which this invention pertains. To the extent to which any patent or non-patent reference incorporated herein or found elsewhere is inconsistent with the disclosure provided herein, it is understood that this disclosure is controlling.

Unless otherwise specified, as used herein, the term "combination" or phrase "combinations thereof" means—"the members of a set or any subset of a set considered without regard to order." For example, wherein the set of items A, B, and C is listed, combinations thereof would be: A and B; A and C; B and C; and A, B, and C; without any regard to order. To the extent that items can be "chemically combined," a combination herein does not exclude a chemical combination occurring, but a chemical combination is not required for items to be in a combination.

As used herein, the term "emulsion," when used in the context of "emulsified asphalt," refers to a dispersion of extremely small asphalt particles, for example particles of about 5 micrometers to about 10 micrometers in diameter and smaller, in a continuous water phase that has been treated with an emulsifying agent.

As used herein, the acronym "RAP" refers to "recycled asphalt pavement," also known to those of skill in the art as "reclaimed asphalt pavement."

As used herein, the acronym "RAS" refers to "recycled asphalt shingles," also known to those of skill in the art as "reclaimed asphalt shingles."

As used herein, the term "crumb rubber" refers to rubber particles that have a particle size of less than about 5 mm, and preferable have a particle size of less than about 2 mm. One of skill in the art will recognize that crumb rubber may be obtained such as from the grinding of used truck tires or automobile tires, or from any other appropriate source of ground rubber.

As used herein, the phrase "warm mix asphalt" refers to an asphalt binder, containing an additive, that can be adequately mixed with aggregate and placed at temperatures of at least about 15° C. lower than a substantially similar asphalt aggregate mixture that does not contain the additive or combinations thereof.

As used herein, "weight percent" or "wt %" refers to the percentage by weight of a material based on the weight of the final composition, usually referring herein to the percentage by weight of the cross-linked, polymer-modified asphalt. It is to be noted that compounds or chemicals added to asphalt may react with other chemical constituents in the asphalt or those added thereto to form one or more different chemicals or compounds. It is general practice, however, for those of skill in the art to describe the composition of a modified asphalt in terms of the ingredients and the amounts added to an asphalt even though a portion, or all, of the added component may react and form one or more different chemicals or compounds.

A. Asphalt

Asphalt is defined by the ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by the ASTM as a class of black or dark-colored cementitious substances, natural or manufactured, composed principally of high molecular weight hydrocarbons, of which asphalts, tars, pitches and asphaltenes are typical. The ASTM further classifies asphalts or bituminous materials as solids, semi-solids, or liquids using a penetration test for consistency or viscosity. In this classification, solid materials are those having a penetration of not more than 1 millimeter when a load of 100 grams is applied for 5 seconds while at 25° C. and semi-solids are those having a penetration of more than 1 millimeter when a load of 50 grams is applied for 5 seconds while at 25° C. Semi-solid and liquid asphalts predominate in commercial practice today.

Asphalt has viscous properties, which allow it to flow, and elastic properties, which resist flow. At elevated temperatures, the viscous properties dominate and the asphalt tends to flow or deform. At lower temperatures, the elastic properties dominate and the asphalt tends to resist flow. All types of asphalt, both naturally occurring and synthetically manufactured, are suitable for use in this invention. Naturally occurring asphalt is inclusive of native rock asphalt, lake asphalt, etc. Synthetically manufactured asphalt is often a by-product of petroleum refining operations and representative examples include airblown asphalt, blended asphalt, cracked or residual asphalt, petroleum asphalt, propane asphalt, straight-run asphalt, thermal asphalt, etc. Examples of asphalt, which are often referred to by their extraction location, include Wyoming Sour, Saudi Heavy, West Texas intermediate, California Valley, Venezuelan, and Canadian.

Asphalt chemistry can be described on the molecular level as well as on the intermolecular (microstructural) level. On the molecular level, asphalt is a mixture of complex organic molecules that range in molecular weight from several hundred to several thousand. Although these molecules affect behavioral characteristics of the asphalt, the behavior of asphalt is largely determined by the microstructure of the asphalt, which is that of a dispersed polar fluid. Specifically, a continuous three-dimensional association of polar molecules (asphaltenes) dispersed in a fluid of non-polar or relatively low-polarity molecules (maltenes). All these molecules are capable of forming dipolar intermolecular bonds of varying strength. Since these intermolecular bonds are weaker than the bonds that hold the basic organic hydrocarbon constituents of asphalt together, they will break first and control the behavioral characteristics of asphalt. Therefore, asphalt's physical characteristics are a direct result of the forming, breaking, and reforming of these intermolecular bonds or other properties associated with molecular superstructures. The result is a material that behaves elastically through the effects of the polar molecule networks and viscously because the various parts of the polar molecule network can move relative to one another due to the dispersion in the fluid non-polar molecules.

Asphalt binders are most commonly characterized by the physical properties that indicate how they perform as a constituent in a paving composition or hot mixed asphalt. Examples of relevant physical properties include durability and rheology, and some tests for evaluating different aspects of these properties include: thin-film oven test (AASHTO 179 and ASTM D 1754), rolling thin-film oven test (AASHTO T 240 and ASTM D 2872), pressure aging vessel test (AASHTO PP 1), penetration test (AASHTO T 49 and ASTM D 4), softening point test (AASHTO T 53 and ASTM D 36), absolute viscosity at 60° C. test (AASHTO T 202 and ASTM D 2171), kinematic viscosity at 135° C. test (AASHTO T 201 and ASTM D 2170), ductility test (AASHTO T 51 and ASTM D113), rotational viscometer test (AASHTO TP 48 and ASTM D 4402), dynamic shear rheometer (AASHTO TP 5 and ASTM D 7175), bending beam rheometer (AASHTO TP1 and ASTM D 6648), separation tendency of polymer from polymer-modified asphalt (ASTM D 7173), and the direct tension test (AASHTO TP 3 and ASTM D 6723).

Rather than refer to an extensive list of physical properties, those in the art typically categorize asphalt binders by one or more grading systems such as the penetration grading system, the viscosity grading system, and the Superpave performance grading system (AASHTO M 320 and ASTM D 6373). Penetration grades are listed as a range of penetration units determined according to AASHTO M 20 and ASTM D 946. The 40-50 grade is the hardest grade, the 60-70, 85-100, and 120-150 grades are typically used in the U.S., and the 200-300 grade is the softest grade and is typically used for cold climates such as northern Canada. Viscosity grading is performed on as-supplied asphalt binders (AC grading) or on aged residue samples (AR grading) according to AASHTO M 226 and ASTM D 3381. Typical grades for hot mixed asphalt in the U.S. are AC-10, AC-20, AC-30, AR-4000, and AR 8000. The more recently developed Superpave performance grade (PG) is generally considered to more accurately and fully characterize asphalt binders for use in hot mixed asphalt pavements. Superpave performance grading is based on the idea that an asphalt binder's properties should be related to the conditions under which it is used. Therefore, the Superpave system uses several tests that are performed according to AASHTO PP6 at temperatures that depend on the relevant climate conditions. The Superpave performance grading is reported using two numbers—the first being the average seven-day maximum pavement temperature (° C.) and the second being the minimum pavement design temperature to be experienced (° C.). Thus, a PG 58-22 is intended for use where the average seven-day maximum pavement temperature is 58° C. and the expected minimum pavement temperature is −22° C. Asphalt binders that are typically used in the U.S. have an average seven-day maximum pavement temperature that is within the range of about 50° C. and about 80° C. and an expected minimum pavement temperature that is within the range of about 10° C. and about 40° C. It is to be noted that as a general rule, PG binders that differ in the high and low temperature specification by 90° C. or more are typically the result of some sort of modification in order to improve certain characteristics such as resistance to high temperature thermal deformation ("creep" or "rutting"), low temperature cracking, or both. In some high traffic areas, even if the expected average seven-day maximum pavement temperature was 58° C., a PG 64-xx or PG 70-xx asphalt might be specified to improve rut resistance (those skilled in the art frequently refer to this as "grade bumping"). Also, the asphalt testing was done at a temperature higher than the environmental temperature.

The Superpave grading system was recently expanded by adding a test method for Multiple Stress Creep and Recovery (MSCR, AASHTO TP 70 and ASTM D 7405). MSCR is a standard rheological test protocol whereby the asphalt is subjected to a constant load for a fixed time period in a Dynamic Shear Rheometer, then allowed to recover at zero load for a fixed time period. The percent recovery measured by MSCR determines the elastic response of asphalt binders. The non-recoverable creep compliance ($J_{nr}$) is the residual strain in a specimen after a creep and recovery cycle divided by the stress applied in kPa. The testing is done at the environmental grade temperatures similar to with Superpave grading, i.e., 58° C., 64° C., 70° C., etc. For improved rut resistance in high traffic areas, a lower $J_{nr}$ is specified, rather than a higher temperature grade. For example, PG 64S-xx indicates standard grade with $J_{nr}$<4.0; PG 64H-xx indicates a heavy traffic grade with $J_{nr}$<2.0, and PG 64V-xx, indicates a very heavy traffic grade with $J_{nr}$<1.0. This procedure eliminates the need for "grade bumping."

The paving compositions disclosed herein is not limited to any particular asphalt binder or combination of binders. Although any asphalt binder may be used, it is preferred that a paving composition comprise an asphalt binder or combination of binders having physical properties suitable for the particular application. The selection of such an asphalt binder or combination of binders is well known to those of skill in the art. Representative examples of commercially available asphalt binders that may be suitable for preparing a paving composition of the present invention include PARAMOUNT PG 58-28, BP PG 58-28, NUSTAR PG 58-28, CONOCO AC-30, DIAMOND SHAMROCK AC-30, SHELL AR-4000, AMOCO 64-22, CITGO AC-30, CITGO PG 67-22, VALERO PG 64-22, and HUSKY 85/100.

B. Crosslinking Agent

In the method of preparing a cross-linked, polymer-modified asphalt of the invention, a crosslinking agent is added to heated asphalt and mixed into the asphalt to form an asphalt-crosslinking agent mixture. This step is performed before the addition of an acid and before the addition of a crosslinkable polymer so that the crosslinking agent is present in the asphalt mixture before the addition of acid and crosslinkable polymer.

Surprisingly, the addition of the crosslinking agent before the addition of acid and crosslinkable polymer resulted in a modified asphalt with improved properties. The % recovery, as measured by Multiple Stress Creep Recovery (MSCR) test, is increased, indicating improved crosslinking. Further, the non-recoverable creep compliance, $J_{nr}$, as measured by MSCR, is generally decreased, indicating improved rut resistance.

One of skill in the art will recognize that there are numerous crosslinking agents that have been used in the preparation of cross-linked asphalts. Representative examples of crosslinking agents include, but are not limited to: elemental sulfur, hydrocarbyl polysulfides, thiurams, dithiocarbamates, sulfur containing oxazoles, thiazole derivatives, sulfur-donor vulcanization accelerators, non-sulfur donor vulcanization accelerators, phenolic resins, peroxides, and selenium. Further, crosslinking agents may be used in combination with each other.

In certain embodiments, the amount of crosslinking agent added to the paving composition is preferably an effective amount. That is to say, an amount that cross-links at least an amount of crosslinkable polymer added to the asphalt to achieve desired performance characteristics in the polymer-modified asphalt. Preferably, the amount of crosslinking agent added does not greatly exceed an effective amount, as the addition of excess crosslinking agent increases the cost of asphalt production and may result in inferior performance or properties. Thus, in certain embodiments, the amount of crosslinking agent added is at least about 0.01 wt %, but does not exceed about 5.0 wt %, of the cross-linked, polymer-modified asphalt. Preferably, the amount of crosslinking agent added does not exceed about 4.0 wt % of the cross-linked, polymer-modified asphalt. More preferably, the amount of crosslinking agent added does not exceed about 3.0 wt % of the cross-linked, polymer-modified asphalt. Even more preferably, the amount of crosslinking agent added does not exceed about 2.0 wt % of the cross-linked, polymer-modified asphalt. Yet even more preferably, the amount of crosslinking agent added does not exceed about 1.0 wt % of the cross-linked, polymer-modified asphalt and more preferable still does not exceed about 0.1 wt % of the cross-linked, polymer-modified asphalt. Thus, in a preferred embodiment, the amount of crosslinking agent comprises from about 0.01 wt % to about 0.1 wt % of the cross-linked, polymer-modified asphalt.

In certain embodiments, the crosslinking agent is elemental sulfur. In such embodiments, the amount of elemental sulfur is at least about 0.01 wt %, but does not exceed about 5.0 wt %, of the cross-linked, polymer-modified asphalt. Preferably, the amount of elemental sulfur added does not exceed about 4.0 wt % of the cross-linked, polymer-modified asphalt. More preferably, the amount of elemental sulfur added does not exceed about 3.0 wt % of the cross-linked, polymer-modified asphalt. Even more preferably, the amount of elemental sulfur added does not exceed about 2.0 wt % of the cross-linked, polymer-modified asphalt. Yet even more preferably, the amount of elemental sulfur added does not exceed about 1.0 wt % of the cross-linked, polymer-modified asphalt and more preferable still does not exceed about 0.1 wt % of the cross-linked, polymer-modified asphalt. Thus, in a preferred embodiment, the amount of elemental sulfur comprises from about 0.01 wt % to about 0.1 wt % of the cross-linked, polymer-modified asphalt.

C. Acid

In the method of preparing a cross-linked, polymer-modified asphalt of the invention, the cross-linked, polymer-modified asphalt comprises an acid. The acid is added after the addition and mixing of a crosslinking agent into the asphalt. In certain embodiments, the acid is added to the asphalt-crosslinking agent mixture before the addition of a crosslinkable polymer. In other embodiments, the acid is added to the asphalt-crosslinking agent mixture after the addition of a crosslinkable polymer. In certain other embodiments, the acid is added simultaneously or nearly so with the crosslinkable polymer.

One of skill in the art will recognize that any of a number of types of acids can be added in the preparation of asphalt. Representative examples of acids that can be used in the preparation of asphalt include, but are not limited to: phosphoric acid, polyphosphoric acid, sulfuric acid, chlorosulfuric acid, hydrohalic acids, nitric acid, organosulfuric acids, boric acid, alkylbenzenesulfonic acids, alkylsulfonic acids, and carboxylic acids. Further, combinations of acids may also be used. When sulfuric acid is used, the concentration of sulfuric acid is preferably more than about 90% concentration by weight. One example of an alkylsulfonic acid is methanesulfonic acid. Representative examples of carboxylic acids include, but are not limited to, adipic acid, citric acid, oxalic acid, tartaric acid, maleic acid, valeric acid, succinic acid, fumaric acid, glutamic acid, phthalic acid, and acetic acid.

In certain embodiments, the amount of acid added to the paving composition is preferably an effective amount. That is to say, an amount added to the asphalt to achieve desired performance characteristics in the polymer-modified asphalt. Preferably, the amount of acid added does not greatly exceed an effective amount, as the addition of excess acid increases the cost of asphalt production. In certain embodiments, the concentration of acid added to the asphalt is at least about 0.01 wt % of the cross-linked, polymer-modified asphalt. More preferably, the concentration of acid added to the asphalt is at least about 0.2 wt % of the cross-linked, polymer-modified asphalt. It has been discovered, however, that asphalt performance may be detrimentally affected by exceeding an upper concentration of acid. Although this upper concentration level varies on the particular asphalt, it is preferred that the concentration of acid added to the asphalt be no greater than about 3 wt % of the cross-linked, polymer-modified asphalt. More preferably, the concentration of acid added to the asphalt is no greater than about 1.5 wt % of the cross-linked, polymer-modified asphalt. Still more preferably, the maximum concentration of acid is no greater than about 1.2 wt % of the cross-linked, polymer-modified asphalt. Even more preferably, the maximum concentration of acid is no greater than about 1.0 wt % of the cross-linked, polymer-modified asphalt and still even more preferably, the concentration of acid added to the asphalt does not exceed about 0.7 wt % of the cross-linked, polymer-modified asphalt.

For example, in view of the foregoing, in certain embodiments of the present invention the acid is at a concentration that is within a range of about 0.01 wt % to about 3.0 wt % of the cross-linked, polymer-modified asphalt. Preferably, the acid is at a concentration that is within a range of about 0.2 wt % to about 1.5 wt % of the cross-linked, polymer-modified asphalt. More preferably, the acid is at a concentration that is within a range of about 0.5 wt % and about 1.0 wt % of the cross-linked, polymer-modified asphalt binder.

In certain embodiments of the invention, polyphosphoric acid used in the preparation of the asphalt paving composition. A polyphosphoric acid is a series of oxyacids of phosphorous having the general chemical formula $H_{n+2}(P_nO_{3n+1})$. More specifically, polyphosphoric acids occur in the $P_2O_5$—$H_2O$ system and have a $P_2O_5$ content that is above about 74 percent. Polyphosphoric acids are complex mixtures of ortho- (n=1), pyro- (n=2), tri- (n=3), tetra (n=4), and longer chain polymer species, the proportions of which are a direct function of the $P_2O_5$ content of the acid. Although polyphosphoric acids may be referred to in terms of $P_2O_5$ content, polyphosphoric acids are typically referred to in terms of an equivalent $H_3PO_4$ (orthophosphoric acid) concentration or percentage.

The polyphosphoric acid used in the preparation of the asphalt paving composition is preferably at least about 100% expressed as orthophosphoric acid content. More preferably, the polyphosphoric acid has an $H_3PO_4$ equivalent concentration of at least about 105%. Still more preferably, the polyphosphoric acid has an $H_3PO_4$ equivalent concentration of at least about 110%. Even more preferably, the polyphosphoric acid has an $H_3PO_4$ equivalent concentration of at least about 115%. Representative examples of appropriate polyphosphoric acids include acids having a $H_3PO_4$ equivalent content of 105% ($P_2O_5$ content of about 76.05%), a $H_3PO_4$ equivalent content of 115% ($P_2O_5$ content of about 83.29%), or a $H_3PO_4$ equivalent content of 116.4% ($P_2O_5$ content of about 84.31%), which are commercially available from ICL Performance Products, LLP, St. Louis, Mo.

Polyphosphoric acids are not water-based and are less corrosive than a water-based phosphoric acids, which is advantageous over water-based phosphoric acids. For example, the mixing of phosphoric acid with hot asphalt under typical blending conditions tends to result in foaming and splattering, whereas polyphosphoric acids are readily incorporated with little or no foaming and splattering.

In certain embodiments, the amount of polyphosphoric acid added to the paving composition is preferably an effective amount, that is to say, an amount that increases the adhesion between the asphalt binder and the aggregate compared to an identical paving composition that contains no polyphosphoric acid. The polyphosphoric acid may also be added to the paving composition in an amount that achieves the maximum anti-stripping benefit as described in U.S. Pat. No. 7,309,390 which is incorporated by reference herein in its entirety. One of skill in the art will recognize that this optimum amount depends on several factors including the type of asphalt (i.e., the chemical composition of the asphalt), the type of aggregate used to make the paving composition, the moisture content of the asphalt and the aggregate, the inclusion of polymer additives, the inclusion of anti-stripping agents, etc.

Preferably, the concentration of polyphosphoric acid added to the asphalt is at least about 0.01 wt % of the cross-linked, polymer-modified asphalt. More preferably, the concentration of polyphosphoric acid added to the asphalt is at least about 0.2 wt % of the cross-linked, polymer-modified asphalt. It has been discovered, however, that asphalt performance may be detrimentally affected by exceeding an upper concentration of polyphosphoric acid. Although this upper concentration level varies on the particular asphalt, it is preferred that the concentration of polyphosphoric acid added to the asphalt be no greater than about 3 wt % of the cross-linked, polymer-modified asphalt. More preferably, the concentration of polyphosphoric acid added to the asphalt is no greater than about 1.5 wt % of the cross-linked, polymer-modified asphalt. Still more preferably, the maximum concentration of polyphosphoric acid is no greater than about 1.2 wt % of the cross-linked, polymer-modified asphalt. Even more preferably, the maximum concentration of polyphosphoric acid is no greater than about 1.0 wt % of the cross-linked, polymer-modified asphalt and still even more preferably, the concentration of polyphosphoric acid added to the asphalt does not exceed about 0.7 wt % of the cross-linked, polymer-modified asphalt.

For example, in view of the foregoing, in certain embodiments of the present invention the polyphosphoric acid is at a concentration that is within a range of about 0.01 wt % to about 3.0 wt % of the cross-linked, polymer-modified asphalt. Preferably, the polyphosphoric acid is at a concentration that is within a range of about 0.2 wt % to about 1.5 wt % of the cross-linked, polymer-modified asphalt. More preferably, the polyphosphoric acid is at a concentration that is within a range of about 0.5 wt % and about 1.0 wt % of the cross-linked, polymer-modified asphalt binder.

D. Crosslinkable Polymer Asphalt Modifiers

In the method of preparing a cross-linked, polymer-modified asphalt of the invention, the cross-linked, polymer-modified asphalt comprises a crosslinkable polymer. The polymer is added after the addition and mixing of a crosslinking agent into the asphalt. In certain embodiments, the polymer is added to the asphalt and crosslinking agent mixture before the addition of an acid. In other embodiments, the polymer is added to the asphalt and crosslinking agent mixture after the addition of an acid. In certain other embodiments, the polymer is added simultaneously or nearly so with the acid.

One of skill in the art will recognize that numerous polymer asphalt modifiers are used in the preparation of polymer-modified asphalt. Representative examples of polymer asphalt modifiers include: styrene-butadiene-styrene (SBS) block co-polymer, styrene-butadiene (SB) block co-polymer, styrene-butadiene random co-polymer (SBR), ethylene vinyl acetate, polyethylene, oxidized polyethylene, ethylene propylene co-polymer, elastomeric terpolymers, atactic polypropylene, isotactic polypropylene, and polyisoprene. Further, combinations of crosslinkable polymer modifiers may also be used. Examples of terpolymers include, ethylene/propylene/diene (EPDM) and ELVALOY (available from DuPont) which is an ethylene-glycidyl-acrylate polymer (i.e., it comprises an ethylene backbone modified with a glycidyl functional group to provide epoxy-like reactive properties and an acrylate functional group to provide flexibility and elastomeric properties). Additional appropriate polymer modifiers may include ethylene-vinyl-acetate (EVA) polymers, ethylene-methacrylate (EMA) polymers, styrene-isoprene copolymers (SIS), epoxy resins, natural rubbers, and polydiolefins such as polybutadiene and polyisoprene.

One of skill in the art will recognize that the concentration of crosslinkable polymer modifiers in the paving composition of the present invention is preferably consistent with the concentration considered appropriate for the particular application and the associated variables such as type of asphalt, type of aggregate, etc. In certain embodiments, the concentration of polymer modifiers is preferably between about 0.5 wt % to about 20 wt % of the cross-linked, polymer-modified asphalt. More preferably, the concentration of polymer is between about 1.0 wt % and about 10 wt % of the cross-linked, polymer-modified asphalt. Even more preferably, the concentration of polymer is between about 2.0 wt % and about 5.0 wt % of the cross-linked, polymer-modified asphalt. Terpolymers, such as the commercially available ELVALOY modifier, typically comprise about 2.0% by weight of the asphalt binder and sometimes as little as about 1.0% by weight of the asphalt binder.

In certain embodiments of the invention, styrene-butadiene-styrene (SBS) is added as the crosslinkable polymer. One of skill in the art would recognize that the concentration of SBS added is preferably consistent with the concentration considered appropriate for the particular application and the associated variables such as type of asphalt, type of aggregate, etc. In such embodiments, the concentration of SBS is preferably between about 0.5 wt % to about 20 wt % of the cross-linked, polymer-modified asphalt. More preferably, the concentration of SBS is between about 1.0 wt % and about 10 wt % of the cross-linked, polymer-modified asphalt. Even more preferably, the concentration of SBS is between about 2.0 wt % and about 5.0 wt % of the cross-linked, polymer-modified asphalt.

E. Anti-Stripping Additives

In the method of preparing a cross-linked, polymer-modified-asphalt of the invention, or in paving compositions comprising such asphalt, anti-stripping agents can also be added.

In certain embodiments, the anti-stripping agent is an alkaline anti-stripping agent, preferable hydrated lime. Hydrated lime comprises calcium hydroxide ($Ca(OH)_2$). Commercial hydrated lime is a dry powder obtained by treating quicklime (calcium oxide, CaO) with sufficient water to satisfy its chemical affinity for water, thereby converting the oxides to hydroxides.

The hydrated lime that is used to prepare a paving composition may be added to the aggregate, asphalt, or both according to any appropriate method. There are several proven and effective methods for adding hydrated lime to asphalt. Examples of such methods include injecting hydrated lime into a drum mixer, adding lime in a pug mill, adding dry hydrated lime to moist aggregate with marination, and adding slurry lime to aggregate with or without marination (see, e.g., "How to Add Hydrated Lime to Asphalt," An Overview of Current Methods, National Lime Association, http:///www.lime.org/publications.html). Typically, the method by which hydrated lime is added is specified by the state departments of transportation. These state-developed specifications and procedures are typically tailored to local materials and the capabilities of construction firms and equipment.

In certain embodiments, the asphalt or paving composition may comprise a surface-active anti-stripping additive, for example an amine-type surface-active anti-stripping agent. It is important to note that type of surface-active anti-stripping additive that may be included in the asphalt or paving composition of the present invention is not limited to the amine-type, but also includes, other commercially available surface-active materials that are known by those of skill in the art to increase adhesion between aggregate and asphalt binder.

Typically, amine-type anti-stripping additives comprise, for example, primary amines, diamines, triamines, tetramines, polyamines, amido amines, or ethoxylated diamines, and so forth. Preferably, a surface-active anti-stripping additive is a liquid so that it is more readily mixed throughout the asphalt. Exemplary commercially available liquid amine anti-stripping additives include the PAVEBOND and MOR-LIFE anti-strips commercially available from Rohm and Haas and the AD-HERE anti-strip available from Arr-Maz Custom Chemicals, Inc.

If included, the concentration of surface-active anti-stripping additive is preferably consistent with the concentration(s) considered appropriate for the particular application and the associated variables such as type of asphalt, type of aggregate, etc. In certain embodiments, the concentration of surface-active anti-stripping additives is between about 0.25% and about 2.0% by weight of the asphalt-aggregate mix.

In other embodiments, however, the asphalt or paving composition of the present invention is preferably not modified with liquid anti-stripping additives, in general, and amine-type anti-strips, in particular. Stated another way, in this embodiment the asphalt binder is preferably substantially free of liquid amine anti-stripping additives. Specifically, the concentration of such additives is, in order of increasing preference, less than about 0.5, 0.2, 0.1, 0.05, or 0.01% by weight of the asphalt binder, or even 0%.

F. Additional Additives

One of skill in the art will recognize that numerous variations on producing a modified asphalt exist and that numerous additional additives and modifiers are used to produce asphalts with improved properties. The present invention contemplates various embodiments in which such variations or additional components are employed.

In certain embodiments, at least one additional quantity of asphalt or mixture of asphalts is added to a quantity of cross-linked, polymer-modified asphalt of the invention and mixed to form a new composition. For example, a "mother solution" of concentrated cross-linked, polymer-modified asphalt may be prepared and subsequently "let down" to the desired additive concentration by mixing with a neat asphalt.

In certain embodiments, the method of producing a cross-linked, polymer-modified asphalt comprises the step of adding crumb rubber and mixing. The addition of crumb rubber to asphalt binders can improve the consistency and properties of the asphalt binders at high and low temperatures. In particular, the addition of crumb rubber can improve the elastic behavior.

In certain embodiments, at least one fluxing agent is further added and mixed into the cross-linked, polymer-modified asphalt composition. Representative examples of fluxing agents include dilution oil, tall oil, and residual bottoms from refined recycled engine lubricating oil. Fluxing agents can be used to lower the viscosity and softening point of the modified asphalt binder.

In certain embodiments, the method of producing a cross-linked, polymer-modified asphalt also includes adding fibers, such as, for example, but not limited to, cellulose fibers, polyester fibers or polypropylene fibers. The fibers reduce "drain down" of asphalt in open aggregate structures such as Stone Matrix Asphalt (SMA).

In certain embodiments, the method of producing a cross-linked, polymer-modified asphalt also includes adding and mixing in a wax. The wax allows asphalt-aggregate mixes to be produced and placed at significantly lower temperatures, such as a warm mix asphalt. Representative waxes used in the production of asphalt include Fisher-Tropsch wax, Montan wax, petroleum wax, polyethylene wax, and amide wax.

In certain embodiments, the method of producing a cross-linked, polymer-modified asphalt also includes adding and mixing in a surfactant. Surfactants allow asphalt-aggregate mixes to be produced and placed at significantly lower temperatures, such as a warm mix asphalt. Representative surfactants include nonionic surfactants, cationic surfactants, anionic surfactants, and amphoteric surfactants.

One of skill in the art will also recognize that water can alter the properties of asphalt. Thus, in certain embodiments, the method of producing a cross-linked, polymer-modified asphalt also includes the addition of water and mixing, the addition of a water-bearing inorganic compound and mixing, or addition of a combination of water and a water-bearing inorganic compound and mixing. Water allows asphalt-aggregate mixes to be produced and placed at significantly lower temperatures, such as a warm mix asphalt. In certain embodiments, the method of producing a cross-linked, polymer-modified asphalt also includes the addition of quantities of sulfur as a binder extender rather than a crosslinking agent. Such sulfur, in excess of 5 wt % of the polymer-modified asphalt, extends the supply of asphalt binders.

G. Preparation of the Asphalt Binder

The preparation of the asphalt binder may be accomplished by any appropriate means known in the art such as direct addition with agitation or in-line mixing. In certain embodiments, direct addition with agitation is accomplished over a period of 5 minutes to 10 hours. In certain other embodiments, in-line mixing of the asphalt is accomplished in less than 5 minutes, for example, in-line mixing of the asphalt is accomplished in several seconds. In certain embodiments, in-line mixing is accomplished in about 1 second to about 10 seconds. In certain embodiments, in-line mixing is accomplished in less than about 5 seconds. In certain embodiments, in-line mixing is accomplished in about 2 seconds. Regardless of the method, the asphalt binder preparation is typically facilitated by increasing the temperature of the asphalt binder and in some instances the additives or modifiers. To facilitate mixing, the temperature is increased to at least the softening point of the asphalt. Typically, the temperature of the mixture is increased to from about 100° C. and about 200° C. After the asphalt is heated to a temperature sufficient for mixing purposes, additives and modifiers such as the crosslinking agent, acid, and crosslinkable polymer, are typically introduced into the feed of asphalt with agitation adequate to disperse the additives throughout the asphalt. In certain embodiments, this temperature is about 140 C. In certain embodiments, after the crosslinking agent, acid, and crosslinkable polymer have all been added to the asphalt, the temperature of the mixture is raised while additional mixing occurs. For example, in certain embodiments, the temperature is raised to about 200° C. Mixing times will vary and can be as long as several hours or more or as little as a few minutes or less, as long as the additives are adequately dispersed throughout the asphalt.

One of skill in the art will recognize that although asphalt binders that comprise asphalt and additives and modifiers may be prepared by blending the constituents in-line at the asphalt plant (often referred to as post-blending), it is preferred that the asphalt and certain additives and modifiers be blended by the asphalt binder supplier before being delivered to the asphalt plant (often referred to as pre-blending or terminal blending). Certain other additives and modifiers, however, for example, surface-active anti-stripping additives, are typically not pre-blended—instead they are typically blended at the mix facility before the asphalt is mixed with the aggregate. Some combinations of asphalt and additives may be mixed relatively easily using a mixing kettle, while others require high shear milling or other special mixing operations. In certain embodiments, high shear mixing is used to mix the asphalt during at least a portion of the mixing after the crosslinkable polymer is added. In certain embodiments, low shear mixing is used at some point to mix the asphalt after the addition of the crosslinking agent, after the addition of the acid, or after the addition of the crosslinking agent and after the addition of the acid.

When adding components to the heated asphalt, in particular when adding the crosslinking agent, the crosslinkable polymer, and the acid, each component may be added in as a single quantity. In other words, all of the components are added to the asphalt at one time. Alternatively, components may be added incrementally. For example, some portion of the crosslinking agent may be added and mixed into the asphalt, and then another portion added and mixed, etc., until the entire amount of crosslinking agent has been incorporated. One of skill in the art will recognize that numerous variations of incremental addition can be devised. For example, some portion of acid may be added and mixed, followed by the addition and mixing of some portion of the crosslinkable polymer, followed by the addition and mixing of more acid, and so forth. It is understood that the present method is not limited by such variations as long as the addition of the acid and crosslinkable polymer follow the addition of the crosslinking agent.

H. Aggregate

Aggregate is a collective term for the mineral materials such as sand, gravel, and crushed stone, that are used with an asphalt binder to form compound materials such as an asphalt paving composition. By volume, aggregate typically accounts for at least about 90% by volume of an asphalt paving composition. For example, it is not uncommon for asphalt paving compositions to comprise between about 92% and about 96% by volume of aggregate.

Aggregate may comprise natural aggregate, manufactured aggregate, or a combination of the two. The mineral composition of the aggregate largely determines the physical and chemical characteristics of the aggregate and how it performs as a pavement material. In particular, the composition of the aggregate significantly affects the susceptibility or propensity of a pavement composition to undergo stripping. For example, some aggregates have an affinity for water over asphalt (hydrophilic), which tends to make them more susceptible to stripping. These aggregates tend to be acidic and examples include quartzite, sandstone, and granite. On the other hand, aggregates with an affinity for asphalt over water (hydrophobic) tend to be less susceptible to stripping. These aggregates tend to be basic and examples include marble, limestone, basalt, and dolomite. The paving composition of the present invention may comprise any appropriate type of paving aggregate.

Although aggregate may be selected to improve the anti-stripping property of the paving composition, the selection of aggregate is not typically based solely on its propensity for stripping. Other factors such as hardness, toughness, abrasion resistance, fatigue resistance, cost, availability, etc., are typically considered and may be of greater importance than anti-stripping. For example, although limestone is generally considered to be a good aggregate in terms of anti-stripping, it is considered a poor aggregate in terms of hardness or toughness.

An aggregate is also selected based on the maximum size or mix size of its particles. Examples of mix sizes include 4.75 mm, 9.5 mm, 12.5 mm, 19.0 mm, 25.0 mm, and 37.5 mm. In addition to mix size, gradation (i.e., the relative amounts of different sized particles, which is typically determined by sieve analysis) tends to be a selection factor. Examples of typical gradations include: dense or well-graded, which is the most widely used in the U.S.; gap graded, which tends to be prone to segregation during placement of the paving composition; open graded, which may result in a greater percentage of voids because there are not enough small particles in between larger particles; and uniformly graded in which all the particles are essentially the same size.

Thus, the selection of an appropriate aggregate type and its properties (e.g., mix size, gradation, moisture content, etc.) for a particular application is based on many factors such as pavement location, traffic type, temperature, etc. and is known and understood by those of skill in the art.

I. Asphalt Paving Composition

In certain embodiments, an acceptable asphalt paving composition is a hot mix asphalt prepared by mixing the asphalt binder including additives and modifiers, and the aggregate, typically treated with lime, at an elevated temperature (e.g., greater than about 150° C.) for a duration to coat the aggregate (e.g., between about 1 hour and about 4 hours) according any method known in the art. In certain other embodiments, an acceptable asphalt paving composition is a warm mix asphalt comprising an asphalt binder including additives and modifiers that can be adequately mixed with aggregate at temperatures of 15° C. to 50° C. lower, in some embodiments even more than 50° C. lower, than a substantially similar asphalt aggregate mixture that does not contain the additive.

Common methods of producing asphalt paving compositions include batch preparation, the parallel-flow drum-mix, and the counter-flow drum mix. Although different methods may be used to combine the aggregate with the asphalt binder, the resulting paving composition is essentially the same—aggregate and binder in an amount sufficient to coat the aggregate and adequately bind the paving composition. Typically, the amount of asphalt binder is at least about 4% by weight with the remainder of the paving composition comprising the aggregate. Additionally, the paving composition typically does not comprise more than about 7% by weight of the asphalt binder because, among other things, it becomes significantly more costly and typically more prone to deformation. In view of this, the concentration of asphalt binder in the paving composition is preferably between about 4% and about 7% by weight. More preferably, the concentration of asphalt binder is between about 4.5% and about 6.5% by weight.

In certain embodiments, a recycled asphalt material is added to the paving composition. Acceptable recycled asphalt materials include, but are not limited to, recycled asphalt pavement and recycled shingles. Combinations of these materials may also be utilized.

In certain embodiments, the method of preparing a paving material involves the preparation of an asphalt emulsion. First, a cross-linked, polymer-modified asphalt is prepared as described herein, this asphalt is then mixed with water and an emulsifier at ambient temperature to create an asphalt emulsion. The asphalt emulsion is spread to a desired thickness and the final step involves breaking the emulsion.

J. Use of an Asphalt Paving Composition

It is important to note that although the addition of phosphoric acid and lime may be used to improve the adhesion between the asphalt and the aggregate, other factors related to how a paving composition is applied play a significant role in the durability of a pavement. For example, it is well known by those of skill in the art that the thickness of the pavement ("lift thickness") and the degree of compaction, often measured as void percentage, affect the permeability of the pavement to water. In general, it is believed that that lift thickness should be between three and about four times that of the aggregate mix size. For example, the preferred lift size for a paving composition containing a 9.5 mm mix size is about 38 mm (about 1.5 inches). The proper mix selection and the lift thickness aids the compaction of the paving composition thereby reducing permeability. Preferably, the compaction of the paving composition is to avoid a percentage that is less than about 7.5%. Typically, the compaction may be such that a void percentage as low as about 4-5% may be attained.

K. Asphalt Roofing Material

Asphalt roofing products are popular among consumers because of their excellent waterproofing capabilities. The specific type of asphalt product desired by an end user varies depending on a number of factors such as the end-user's budget, the ease of installation, the type of surface area to which the product is being applied, and the climate and weather patterns of the location where the roofing products are installed. Certain embodiments of the invention are drawn to a roofing material comprising a cross-linked, polymer-modified asphalt prepared as described herein.

The asphalt comprising a roofing material may also comprise mineral fillers. Any mineral filler or combinations of mineral fillers known to be appropriate for inclusion in roofing asphalt and/or a mineral filler or fillers that are conventionally using in roofing asphalt may be used to produce a roofing material in accordance with the method of preparing a cross-linked, polymer-modified asphalt of the present invention. A typical mineral filler is limestone. Another typical mineral filler is stone dust. Typically, mineral filler particles are characterized in terms of sieve mesh size usually in terms of percentage remaining on, or falling through a particular screen size. For example, it is contemplated that the particle size distribution of the mineral filler is an amount between about 75% and about 95% smaller than 200 mesh. It is also contemplated that the particle size distribution is an amount between about 80% and about 90% smaller than 200 mesh. If included, a mineral filler typically is at a concentration that is at least about 50 wt % and no greater than about 70 wt % of the total formulation. For example, it is contemplated that in certain embodiments, the filler is limestone having a particle size distribution that is about 85% smaller than 200 mesh, and it is at a concentration of at least about 55 wt % and not greater than about 65 wt % of the total formulation.

EXAMPLES

The following disclosed embodiments are merely representative of the invention which may be embodied in various forms. Thus, specific structural and functional details disclosed in the following examples are not to be interpreted as limiting.

The addition of sulfur to the asphalt before the addition of crosslinkable polymer and polyphosphoric acid increased % recovery, as measured by the Multiple Stress Creep Recovery (MSCR) test and generally decreased the non-recoverable creep compliance, as measured by MSCR in cross-linked, polymer-modified asphalt compositions prepared with three different bitumens. The bitumens used were PARAMOUNT PG 58-28 (Paramount Petroleum, CA), BP PG 58-28 (BP Asphalt USA, Chicago, Ill.), and NUSTAR PG 58-28 (Nustar Energy LP, San Antonio, Tex.). The cross-linked, polymer-modified asphalt compositions were prepared using the following blend procedures:

(1) the bitumen was heated to about 140° C.;
(2) a first modifier was added and low shear mixing was maintained for a length of time;
(3) a second modifier was added and low shear mixing was maintained for a length of time;
(4) a third modifier was added and mixed using low shear mixing; and
(5) the temperature was raised to 200° C. and low shear mixing was maintained for 6 hours.

The Styrene-Butadiene-Styrene (SBS) block copolymer used as the crosslinkable polymer was D1101 from Kraton Polymers US (Houston, Tex.). The polyphosphoric acid added was 105% from ICL Performance Products LLP (St. Louis, Mo.). The elemental sulfur was from Sigma Aldrich (Milwaukee, Wis.).

Example 1

Tables 1A and 1B show results using Paramount PG 58-28. In Sample 1, polyphosphoric acid was added first, SBS second, and sulfur third. In Sample 2, sulfur was added first, polyphosphoric acid second, and SBS third. The concentration of additives and the amount of mixing time between additives is indicated in Table 1A. When sulfur was added first, the % recovery as measured by the MSCR increased from 60.2 to 70.9 while non-recoverable creep compliance, $J_{nr}$, as measured by MSCR decreased from 0.23 to 0.08. Sample 3 tested just SBS polymer and sulfur without the addition of polyphosphoric acid. Absence of polyphosphoric acid resulted in lower % recovery and higher non-recoverable creep compliance.

TABLE 1A

|  |  | Sample | | |
| --- | --- | --- | --- | --- |
|  |  | 1 comparative | 2 inventive | 3 comparative |
| asphalt |  | Paramount | Paramount | Paramount |
| SBS (Kraton) |  | D1101 | D1101 | D1101 |
| added 1 |  | 0.8% PPA | 0.04% S | 3% SBS |
| mixed, minutes |  | 20 | 30 | 30 |
| added 2 |  | 2.0% SBS | 0.8% PPA | 0.06% S |
| mixed, minutes |  | 5 | 20 |  |
| added 3 |  | 0.04% S | 2.0% SBS |  |
| MSCR, % recovery @ 3.2 kPa, 64° C. | D 7405 | 60.2 | 70.9 | 28.4 |
| MSCR, $J_{nr}$ at 3.2 kPa and 64° C., 1/kPa | D 7405 | 0.23 | 0.08 | 1.37 |
| Elastic Recovery @ 25° C., % | T 301 + mods | 71.3 | 75.5 | 81.6 |
| PG Grade |  | 76-28 | 76-28 | 70-28 |
| Continuous Grade |  | 81.3-29.4 | 78.8-28.0 | 71.2-28.1 |
| Separation, % Diff Top & Bot G*/sind | D 7173 | 1.3 | 5.0 | 5.2 |
| Un-aged Binder Tests: |  |  |  |  |
| Viscosity-Rotational, Pa-sec; 135° C. | TP 48 | 1.200 | 1.058 | 0.645 |
| Dynamic Shear Rheometer | T 315 |  |  |  |
|  | Temp Pass | 76 | 76.0 | 70 |
| Phase Angle, degrees |  | 72.4 | 73.1 | 73.8 |
| G* @ 10 rad/sec, kPa |  | 1.620 | 1.28 | 1.35 |
| G*/sin delta @ 10 rad/sec, kPa |  | 1.700 | 1.34 | 1.41 |
|  | Temp Fail | 82 | 82.0 | 76.0 |
| Phase Angle, degrees |  | 77.5 | 75.7 | 74.6 |
| G* @ 10 rad/sec, kPa |  | 0.916 | 0.712 | 0.75 |
| G*/sin delta @ 10 rad/sec, kPa |  | 0.938 | 0.735 | 0.78 |

TABLE 1B

|  |  | Sample | | |
| --- | --- | --- | --- | --- |
|  |  | 1 comparative | 2 inventive | 3 comparative |
| RTFO Residue Tests: | | | | |
| Mass Loss, % | T 240 | −0.090 | −0.138 | −0.235 |
| Dynamic Shear Rheometer | T 315 | | | |
|  | Temp Pass | 82 | 82.0 | 70.0 |
| Phase Angle, degrees | | 58.8 | 58.3 | 69.2 |
| G* @ 10 rad/sec, kPa | | 2.75 | 6.30 | 2.32 |
| G*/sin delta @ 10 rad/sec, kPa | | 3.22 | 7.40 | 2.49 |
|  | Temp Fail | 88 | 88.0 | 76.00 |
| Phase Angle, degrees | | 62.1 | 60.3 | 70.8 |
| G* @ 10 rad/sec, kPa | | 1.70 | 3.20 | 1.28 |
| G*/sin delta @ 10 rad/sec, kPa | | 1.92 | 3.69 | 1.36 |
| Elastic Recovery @ 25° C., % | T 301 + mods | 71.3 | 75.5 | 81.55 |
| PAV Residue Tests: | | | | |
| Dynamic Shear Rheometer | T 315 | | | |
|  | Temp Pass | 19 | 28 | 25 |
| Phase Angle, degrees | | 39.4 | 41.7 | 45.4 |
| G* @ 10 rad/sec, kPa | | 6010 | 2390 | 3310 |
| G*sin delta @ 10 rad/sec, kPa | | 3820 | 1590 | 2360 |
| Bending Beam Rheometer | T 313 | | | |
|  | Temp Pass | −18 | −18 | −18 |
| s, 60 s, Mpa | | 201 | 223 | 246 |
| M-value, 60 s | | 0.308 | 0.300 | 0.301 |
|  | Temp Fail | −24 | −24 | −24 |
| s, 60 s, Mpa | | 374 | 448 | 467 |
| M-value, 60 s | | 0.277 | 0.242 | 0.245 |

Example 2

Tables 2A and 2B show results using BP PG 58-28. In Sample 4, polyphosphoric acid was added first, SBS second, and sulfur third. In Sample 5, sulfur was added first, and then polyphosphoric acid and SBS were added together. The concentration of additives and the amount of mixing time between additives is indicated in Table 2A. When sulfur was added first, the % recovery as measured by the MSCR increased from 48.7 to 54.6 while non-recoverable creep compliance, $J_{nr}$, as measured by MSCR decreased from 0.63 to 0.43. Sample 6 tested just SBS polymer and sulfur without the addition of polyphosphoric acid. Absence of polyphosphoric acid resulted in lower % recovery and higher non-recoverable creep compliance.

TABLE 2A

|  |  | Sample | | |
| --- | --- | --- | --- | --- |
|  |  | 4 comparative | 5 inventive | 6 comparative |
| asphalt | | BP | BP | BP |
| SBS (Kraton) | | D1101 | D1101 | D1101 |
| added 1 | | 0.8% PPA | 0.04% S | 3% SBS |
| mixed, minutes | | 20 | 5 | 30 |
| added 2 | | 2.0% SBS | 0.08% PPA | 0.06% S |
| mixed, minutes | | 5 | 0 | |
| added 3 | | 0.04% S | 2.0% SBS | |
| MSCR, % recovery @ 3.2 kPa, 64° C. | D 7405 | 48.7 | 54.6 | 26.9 |
| MSCR, $J_{nr}$ at 3.2 kPa and 64° C., 1/kPa | D 7405 | 0.63 | 0.43 | 1.41 |
| Elastic Recovery @ 25° C., % | T 301 + mods | 76.3 | 76.3 | 82.5 |
| PG Grade | | 70-28 | 70-28 | 64-22 |
| Continuous Grade | | 73.4-29.17 | 72.7-29.44 | 69.8-27.9 |
| Separation, % Diff Top & Bot G*/sind | D 7173 | 0 | 2 | 0.9 |
| Un-aged Binder Tests: | | | | |
| Viscosity-Rotational, Pa-sec; 135° C. | TP 48 | 0.715 | 1.067 | 0.610 |
| Dynamic Shear Rheometer | T 315 | | | |
|  | Temp Pass | 70 | 76 | 64 |
| Phase Angle, degrees | | 72 | 75.6 | 74.2 |
| G* @ 10 rad/sec, kPa | | 1.35 | 1.120 | 1.96 |

TABLE 2A-continued

|  |  | Sample | | |
|---|---|---|---|---|
|  |  | 4 comparative | 5 inventive | 6 comparative |
| G*/sin delta @ 10 rad/sec, kPa |  | 1.42 | 1.160 | 2.04 |
|  | Temp Fail | 76.0 | 82 | 70.0 |
| Phase Angle, degrees |  | 75 | 79.3 | 75 |
| G* @ 10 rad/sec, kPa |  | 0.755 | 0.621 | 1.05 |
| G*/sin delta @ 10 rad/sec, kPa |  | 0.781 | 0.632 | 1.09 |

TABLE 2B

|  |  | Sample | | |
|---|---|---|---|---|
|  |  | 4 comparative | 5 inventive | 6 Comparative |
| RTFO Residue Tests: |  |  |  |  |
| Mass Loss, % | T 240 | −0.274 | −0.347 | −0.232 |
| Dynamic Shear Rheometer | T 315 |  |  |  |
|  | Temp Pass | 70 | 76 | 64.0 |
| Phase Angle, degrees |  | 66.1 | 62.3 | 69.2 |
| G* @ 10 rad/sec, kPa |  | 3.05 | 3.45 | 3.80 |
| G*/sin delta @ 10 rad/sec, kPa |  | 3.34 | 3.90 | 4.07 |
|  | Temp Fail | 76.00 | 82 | 70.00 |
| Phase Angle, degrees |  | 68.2 | 65.6 | 71.2 |
| G* @ 10 rad/sec, kPa |  | 1.70 | 2.06 | 2.05 |
| G*/sin delta @ 10 rad/sec, kPa |  | 1.83 | 2.26 | 2.16 |
| Elastic Recovery @ 25° C., % | T 301 + mods | 76.3 | 75.0 | 82.5 |
| PAV Residue Tests: |  |  |  |  |
| Dynamic Shear Rheometer | T 315 |  |  |  |
|  | Temp Pass | 25 | 19 | 25 |
| Phase Angle, degrees |  | 44.3 | 42.9 | 47.4 |
| G* @ 10 rad/sec, kPa |  | 3150 | 5760 | 3090 |
| G*sin delta @ 10 rad/sec, kPa |  | 2200 | 3920 | 2270 |
| Bending Beam Rheometer | T 313 |  |  |  |
|  | Temp Pass | −18 | −18 | −12 |
| s, 60 s, Mpa |  | 213 | 188 | 109 |
| M-value, 60 s |  | 0.315 | 0.336 | 0.354 |
|  | Temp Fail | −24 | −24 | −18 |
| s, 60 s, Mpa |  | 454 | 400 | 231 |
| M-value, 60 s |  | 0.238 | 0.302 | 0.299 |

Example 3

Tables 3A and 3B show results using Nustar PG 58-28. In Sample 7, polyphosphoric acid was added first, SBS second, and sulfur third. In Sample 8, sulfur was added first, and then polyphosphoric acid and SBS were added together. The concentration of additives and the amount of mixing time between additives is indicated in Table 3A. When sulfur was added first, the % recovery as measured by the MSCR increased from 63.3 to 70.5 while non-recoverable creep compliance, $J_{nr}$, as measured by MSCR was about the same at 0.23 versus 0.20. Sample 9 tested just SBS polymer and sulfur without the addition of polyphosphoric acid. Absence of polyphosphoric acid resulted in lower % recovery and higher non-recoverable creep compliance.

TABLE 3A

|  |  | Sample | | |
|---|---|---|---|---|
|  |  | 7 comparative | 8 inventive | 9 comparative |
| asphalt |  | Nustar | Nustar | Nustar |
| SBS (Kraton) |  | D1101 | D1101 | D1101 |
| added 1 |  | 0.8% PPA | 0.04% S | 3% SBS |
| mixed, minutes |  | 20 | 1 | 30 |
| added 2 |  | 2.0% SBS | 0.8% PPA | 0.06% S |
| mixed, minutes |  | 5 | 0 |  |
| added 3 |  | 0.04% S | 02.0% SBS |  |
| MSCR, % recovery @ 3.2 kPa, 64° C. | D 7405 | 63.3 | 70.5 | 16 |
| MSCR, $J_{nr}$ at 3.2 kPa and 64° C., 1/kPa | D 7405 | 0.20 | 0.23 | 1.75 |

TABLE 3A-continued

|  |  | Sample | | |
| --- | --- | --- | --- | --- |
|  |  | 7 comparative | 8 inventive | 9 comparative |
| Elastic Recovery @ 25° C., % | T 301 + mods | 83.5 | 82.5 | 63.8 |
| PG Grade |  | 76-28 | 76-28 | PG 70-28 |
| Continuous Grade |  | 77.0-31.9 | 76.8-31.95 | 71.2-31.49 |
| Separation, % Diff Top & Bot G*/sind | D 7173 | 2 | 3 | 5.6 |
| Un-aged Binder Tests: |  |  |  |  |
| Viscosity-Rotational, Pa-sec; 135° C. | TP 48 | 1.067 | 1.008 | 0.640 |
| Dynamic Shear Rheometer | T 315 |  |  |  |
|  | Temp Pass | 76 | 76 | 70 |
| Phase Angle, degrees |  | 74.2 | 75.5 | 75.7 |
| G* @ 10 rad/sec, kPa |  | 1.08 | 1.06 | 1.11 |
| G*/sin delta @ 10 rad/sec, kPa |  | 1.12 | 1.10 | 1.14 |
|  | Temp Fail | 82.0 | 82 | 76 |
| Phase Angle, degrees |  | 77.7 | 79.4 | 77.8 |
| G* @ 10 rad/sec, kPa |  | 0.596 | 0.588 | 0.609 |
| G*/sin delta @ 10 rad/sec, kPa |  | 0.610 | 0.598 | 0.623 |

TABLE 3B

|  |  | Sample | | |
| --- | --- | --- | --- | --- |
|  |  | 7 comparative | 8 inventive | 9 comparative |
| RTFO Residue Tests: |  |  |  |  |
| Mass Loss, % | T 240 | −0.156 | −0.433 | −0.320 |
| Dynamic Shear Rheometer | T 315 |  |  |  |
|  | Temp Pass | 76.0 | 76 | 70 |
| Phase Angle, degrees |  | 60.9 | 63.3 | 72.5 |
| G* @ 10 rad/sec, kPa |  | 3.19 | 2.84 | 3.19 |
| G*/sin delta @ 10 rad/sec, kPa |  | 3.65 | 3.18 | 3.34 |
|  | Temp Fail | 82.00 | 82 | 76.00 |
| Phase Angle, degrees |  | 63.8 | 66.5 | 74.6 |
| G* @ 10 rad/sec, kPa |  | 1.89 | 1.68 | 1.78 |
| G*/sin delta @ 10 rad/sec, kPa |  | 2.11 | 1.83 | 1.85 |
| Elastic Recovery @ 25° C., % | T 301 + mods | 83.5 | 82.5 | 63.8 |
| PAV Residue Tests: |  |  |  |  |
| Dynamic Shear Rheometer | T 315 |  |  |  |
|  | Temp Pass | 28 | 16 | 25 |
| Phase Angle, degrees |  | 48.2 | 43.2 | 53.7 |
| G* @ 10 rad/sec, kPa |  | 1390 | 7100 | 2010 |
| G*sin delta @ 10 rad/sec, kPa |  | 1030 | 4860 | 1620 |
| Bending Beam Rheometer | T 313 |  |  |  |
|  | Temp Pass | −18 | −18 | −18 |
| s, 60 s, Mpa |  | 169 | 184 | 182 |
| M-value, 60 s |  | 0.370 | 0.352 | 0.342 |
|  | Temp Fail | −24 | −24 | −24 |
| s, 60 s, Mpa |  | 405 | 386 | 429 |
| M-value, 60 s |  | 0.292 | 0.312 | 0.275 |

Figure 1:
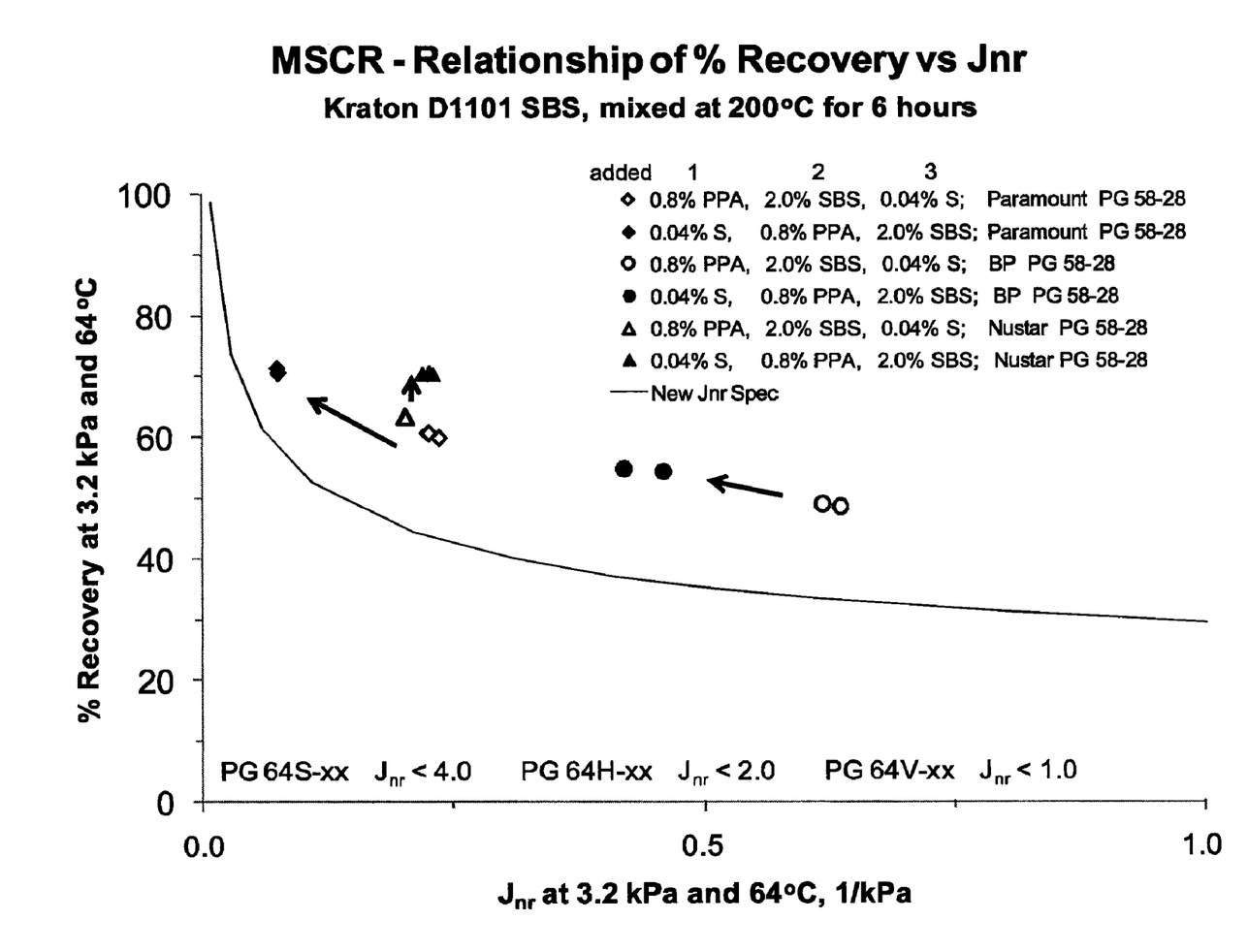
FIG. 1 shows combined specifications and data according to Examples 1, 2, and 3 for asphalt formulations, comparing how the order of addition of additives and modifiers affects properties as measured by the Multiple Stress Creep Recovery (MSCR) test.

FIG. 1 shows combined specifications and data according to Examples 1, 2, and 3 for asphalt formulations, comparing how the order of addition of additives and modifiers affects properties as measured by the Multiple Stress Creep Recovery (MSCR) test. The line labeled "New $J_{nr}$ Spec" indicates the minimum acceptable % recovery at the indicated $J_{nr}$. Addition of the crosslinking agent first resulted in a shift upward—representing an increase in % recovery—and a shift generally to the left—indicating a decrease in $J_{nr}$. Shifting the properties on an asphalt composition upward and to the left in FIG. 1 is desirable because an asphalt with these properties is more resistant to rutting.

What is claimed is:

1. A method of preparing a cross-linked, polymer-modified asphalt, the method comprising the steps of:
   heating an asphalt;
   adding a crosslinking agent to the asphalt and mixing to form an asphalt-crosslinking agent mixture; and
   adding a crosslinkable polymer and an acid to the asphalt-crosslinking agent mixture; wherein following the addition of the crosslinking agent to the asphalt and the mixing to form an asphalt-crosslinking agent mixture, the acid is added and mixed with the asphalt-crosslinking agent mixture before the crosslinkable polymer is added and mixed with the asphalt-crosslinking agent mixture, thus forming a cross-linked, polymer-modified asphalt.

2. The method of claim 1, wherein the crosslinking agent is selected from the group consisting of elemental sulfur, hydrocarbyl polysulfides, thiurams, dithiocarbamates, sulfur containing oxazoles, thiazole derivatives, sulfur-donor vulcanization accelerators, non-sulfur donor vulcanization accelerators, phenolic resins, peroxides, selenium, and combinations thereof.

3. The method of claim 1, wherein the crosslinking agent comprises from about 0.01 wt % to about 5.0 wt % of the cross-linked, polymer-modified asphalt.

4. The method of claim 1, wherein the crosslinking agent is elemental sulfur.

5. The method of claim 4, wherein the sulfur comprises from about 0.01 wt % to about 5.0 wt % of the cross-linked, polymer-modified asphalt.

6. The method of claim 5, wherein the sulfur comprises from about 0.01 wt % to about 0.1 wt % of the cross-linked, polymer-modified asphalt.

7. The method of claim 1, wherein the crosslinkable polymer is selected from the group consisting of styrene-butadiene (SB) block co-polymer, styrene-butadiene random co-polymer (SBR), styrene-butadiene-styrene (SBS) block co-polymer, ethylene vinyl acetate, polyethylene, oxidized polyethylene, ethylene propylene co-polymers, ethylene/propylene/diene (EPDM) terpolymers, atactic polypropylene, isotactic polypropylene, polyisoprene, and combinations thereof.

8. The method of claim 1, wherein the crosslinkable polymer comprises from about 0.5 wt % to about 20 wt % of the cross-linked, polymer-modified asphalt.

9. The method of claim 1, wherein the crosslinkable polymer is styrene-butadiene-styrene (SBS) block co-polymer.

10. The method of claim 9, wherein the styrene-butadiene-styrene (SBS) block co-polymer comprises from about 0.5 wt % to about 20 wt % of the cross-linked, polymer-modified asphalt.

11. The method of claim 9, wherein the styrene-butadiene-styrene (SBS) block co-polymer comprises from about 2.0 wt % to about 5.0 wt % of the cross-linked, polymer-modified asphalt.

12. The method of claim 1, wherein the crosslinkable polymer is styrene-butadiene (SB) block co-polymer.

13. The method of claim 9, wherein the styrene-butadiene (SB) block co-polymer comprises from about 0.5 wt % to about 20 wt % of the cross-linked, polymer-modified asphalt.

14. The method of claim 9, wherein the styrene-butadiene (SB) block co-polymer comprises from about 2.0 wt % to about 5.0 wt % of the cross-linked, polymer-modified asphalt.

15. The method of claim 1, wherein the crosslinkable polymer is styrene-butadiene random co-polymer (SBR).

16. The method of claim 9, wherein the styrene-butadiene random co-polymer (SBR) comprises from about 0.5 wt % to about 20 wt % of the cross-linked, polymer-modified asphalt.

17. The method of claim 9, wherein the styrene-butadiene random co-polymer (SBR) comprises from about 2.0 wt % to about 5.0 wt % of the cross-linked, polymer-modified asphalt.

18. The method of claim 1, wherein the acid is selected from the group consisting of phosphoric acid, polyphosphoric acid, sulfuric acid, chlorosulfuric acid, hydrohalic acids, nitric acid, organosulfuric acids, boric acid, carboxylic acids, alkylbenzenesulfonic acids, alkylsulfonic acids, and combinations thereof.

19. The method of claim 1, wherein the acid comprises from about 0.01 wt % to about 3.0 wt % of the cross-linked, polymer-modified asphalt.

20. The method of claim 1, wherein the acid is polyphosphoric acid.

21. The method of claim 20, wherein the polyphosphoric acid comprises from about 0.01 wt % to about 3.0 wt % of the cross-linked, polymer-modified asphalt.

22. The method of claim 20, wherein the polyphosphoric acid comprises from about 0.2 wt % to about 1.5 wt % of the cross-linked, polymer-modified asphalt.

23. The method of claim 1, wherein low shear mixing is used to mix the asphalt after the addition of the crosslinking agent, after the addition of the acid, or after the addition of the crosslinking agent and after the addition of the acid.

24. The method of claim 1, wherein high shear mixing is used to mix the asphalt during at least a portion of the mixing after the crosslinkable polymer is added.

25. The method of claim 1, further comprising the step of adding at least one additional quantity of asphalt or mixture of asphalts to the cross-linked, polymer-modified asphalt formed by the step of claim 1 and mixing to form a new composition.

26. The method of claim 1, wherein the method further comprises the step of adding crumb rubber and mixing.

27. The method of claim 1, further comprising the step of adding at least one fluxing agent selected from the group consisting of dilution oil, tall oil, and residual bottoms from refined recycled engine lubricating oil, and mixing.

28. The method of claim 1, further comprising the step of adding at least one anti-strip agent selected from the group consisting of phosphate ester, amine, and polyamine, and mixing.

29. The method of claim 1, further comprising the step of adding at least one wax selected from the group consisting of Fisher-Tropsch wax, Montan wax, petroleum wax, polyethylene wax, and amide wax, and mixing.

30. The method of claim 1, further comprising the step of adding at least one surfactant selected from the group consisting of nonionic surfactants, cationic surfactants, anionic surfactants, and amphoteric surfactants, and mixing.

31. The method of claim 1, further comprising the step of adding water, a water-bearing inorganic compound, or a combination thereof, and mixing.

32. The method of claim 1, wherein at least one of the crosslinking agent, crosslinkable polymer, or acid is added and mixed incrementally, either simultaneously or sequentially.

33. A method of preparing a paving material comprising the steps of:
preparing the cross-linked, polymer-modified asphalt of claim 1;
mixing the modified asphalt with water and an emulsifier at ambient temperature to create an asphalt emulsion;
spreading the asphalt emulsion at a desired thickness; and
breaking the emulsion.

34. A method of preparing a cross-linked, polymer-modified asphalt with an increased % recovery, as measured by the Multiple Stress Creep Recovery test, wherein the asphalt is prepared according to the method of claim 1, and wherein the increase in % recovery is determined by comparing the % recovery of said asphalt to an asphalt that is identical in composition but is prepared by a method that does not comprise adding the crosslinking agent and acid to the asphalt before adding the crosslinkable polymer.

35. The method of claim 34 wherein the increase in % recovery is determined by comparing the % recovery of said asphalt to an asphalt that is identical in composition but is prepared by a method wherein the polymer and acid are added before the crosslinking agent.

36. The method of claim 34 wherein the increase in % recovery is at least about 5%.

* * * * *

(12) INTER PARTES REEXAMINATION CERTIFICATE (1230th)
United States Patent
Fee et al.

(10) Number: US 8,198,350 C1
(45) Certificate Issued: Feb. 9, 2016

(54) POLYMER-MODIFIED ASPHALT WITH A CROSSLINKING AGENT AND METHODS OF PREPARING

(75) Inventors: Darrell C. Fee, Chesterfield, MO (US); Rene Maldonado, Brentwood, MO (US); Enrique E. Romagosa, Holladay, UT (US)

(73) Assignee: ICL Performance Products LP

Reexamination Request:
No. 95/002,279, Sep. 14, 2012

Reexamination Certificate for:
Patent No.: 8,198,350
Issued: Jun. 12, 2012
Appl. No.: 12/704,185
Filed: Feb. 11, 2010

(51) Int. Cl.
*E01C 7/26* (2006.01)
*C08L 95/00* (2006.01)
*C08L 53/02* (2006.01)
*C08L 91/06* (2006.01)

(52) U.S. Cl.
CPC .............. *C08L 95/00* (2013.01); *C08L 53/02* (2013.01); *C08L 91/06* (2013.01); *C08L 2555/50* (2013.01); *C08L 2555/54* (2013.01); *C08L 2555/84* (2013.01)

(58) Field of Classification Search
None
See application file for complete search history.

(56) References Cited

To view the complete listing of prior art documents cited during the proceeding for Reexamination Control Number 95/002,279, please refer to the USPTO's public Patent Application Information Retrieval (PAIR) system under the Display References tab.

*Primary Examiner* — Ling Xu (57) ABSTRACT

Methods of preparing a cross-linked, polymer-modified asphalt is provided. The method involves adding a crosslinking agent to asphalt prior to the addition of a crosslinkable polymer and an acid. Asphalt prepared by the disclosed methods exhibit improved properties such as properties measured by the Multiple Stress Creep Recovery (MSCR) test.

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 13-14, 16-17 and 32 are cancelled.

Claim 1 is determined to be patentable as amended.

Claims 3-12, 15, 18-31 and 33-36, dependent on an amended claim, are determined to be patentable.

1. A method of preparing a cross-linked, polymer-modified asphalt, the method comprising the steps of:
   heating an *unmodified* asphalt;
   adding a crosslinking agent *comprising elemental sulfur* to the *unmodified* asphalt and mixing to form an asphalt-crosslinking agent mixture; and
   adding a crosslinkable polymer and an acid to the asphalt-crosslinking agent mixture; wherein following the addition of the crosslinking agent to the *unmodified* asphalt and the mixing to form an asphalt-crosslinking agent mixture, the acid is added and mixed with the asphalt-crosslinking agent mixture before the crosslinkable polymer is added and mixed with the asphalt-crosslinking agent mixture, thus forming a cross-linked, polymer-modified asphalt *and wherein the crosslinkable polymer comprises styrene-butadiene (SB) block co-polymer, styrene-butadiene random co-polymer (SBR), styrene-butadiene-styrene (SBS) block co-polymer, polyethylene, oxidized polyethylene, an ethylene propylene co-polymer, an ethylene/propylene/diene (EPDM) ter-polymer, atactic polypropylene, isotactic polypropylene, polyisoprene, ethylene-glycidyl-acrylate polymer, an ethylene-vinyl-acetate (EVA) polymer, an ethylene-methacrylate (EMA) polymer, a styrene-isoprene copolymer (SIS), an epoxy resin, a natural rubber, a polydiolefin, or a combination thereof.*

\* \* \* \* \*